(12) United States Patent
Alexander et al.

(10) Patent No.: US 11,558,914 B2
(45) Date of Patent: Jan. 17, 2023

(54) DEVICE PAIRING IN HOT DESKING ENVIRONMENTS

(71) Applicant: Cisco Technology, Inc., San Jose, CA (US)

(72) Inventors: William Sterling Alexander, Durham, NC (US); Marcin Michal Limanski, Durham, NC (US); Vikas Vashisht, Morrisville, NC (US); John Paul Carlson, Raleigh, NC (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 81 days.

(21) Appl. No.: 17/314,671

(22) Filed: May 7, 2021

(65) Prior Publication Data

US 2022/0361265 A1 Nov. 10, 2022

(51) Int. Cl.
*H04W 4/00* (2018.01)
*H04W 76/14* (2018.01)
(Continued)

(52) U.S. Cl.
CPC ............ *H04W 76/14* (2018.02); *H04B 11/00* (2013.01); *H04W 4/023* (2013.01); *H04W 4/80* (2018.02); *H04W 8/005* (2013.01)

(58) Field of Classification Search
CPC ....... H04W 76/14; H04W 4/80; H04W 4/023; H04W 8/005; H04B 11/00
(Continued)

(56) References Cited

U.S. PATENT DOCUMENTS

| 8,170,480 B1* | 5/2012 | Kammer | H04W 12/08 709/227 |
| 8,711,656 B1* | 4/2014 | Paulson | H04B 5/0031 367/135 |

(Continued)

FOREIGN PATENT DOCUMENTS

| CN | 109587669 A | 4/2019 |
| WO | 2019144758 A1 | 8/2019 |

OTHER PUBLICATIONS

NXP, "NFC Pairing—Bluetooth & Wi-Fi pairing with NFC", Doc Order No. 9397-750-17656, Apr. 2015, 2 pages.
(Continued)

*Primary Examiner* — Marceau Milord
(74) *Attorney, Agent, or Firm* — Edell, Shapiro & Finnan, LLC

(57) ABSTRACT

In one example, a server obtains an indication that a first mobile device is in a predetermined proximity to a non-mobile device. In response, the server permits the first mobile device to pair with the non-mobile device. The server generates whitelisted information associated with the first mobile device by adding information associated with the first mobile device to a whitelist that controls mobile device pairing for the non-mobile device. The server also obtains an indication that a given mobile device has obtained one or more keep-alive messages from the non-mobile device. Based on the whitelisted information, the server determines whether to permit the given mobile device to pair or remain paired with the non-mobile device. In response to determining to permit the given mobile device to pair or remain paired with the non-mobile device, the server permits the given mobile device to pair or remain paired with the non-mobile device.

20 Claims, 5 Drawing Sheets

(51) Int. Cl.
*H04W 4/02* (2018.01)
*H04W 8/00* (2009.01)
*H04B 11/00* (2006.01)
*H04W 4/80* (2018.01)

(58) Field of Classification Search
USPC .......................................................... 370/328
See application file for complete search history.

(56) References Cited

U.S. PATENT DOCUMENTS

| | | | |
|---|---|---|---|
| 9,730,255 B1 | 8/2017 | Chu et al. | |
| 10,278,016 B2* | 4/2019 | Bitra | G01S 5/0009 |
| 10,750,552 B2* | 8/2020 | Witkowski | H04W 76/38 |
| 2005/0189006 A1* | 9/2005 | Wolcott | B63B 34/565 135/21 |
| 2007/0123165 A1* | 5/2007 | Sheynman | H04W 8/005 455/41.2 |
| 2009/0081999 A1* | 3/2009 | Khasawneh | H04M 3/56 709/206 |
| 2010/0165879 A1* | 7/2010 | Gupta | H04W 48/20 370/254 |
| 2010/0332668 A1* | 12/2010 | Shah | H04L 67/52 709/229 |
| 2014/0134951 A1* | 5/2014 | Paulson | H04W 12/06 455/41.2 |
| 2014/0187167 A1* | 7/2014 | Gupta | H04W 76/10 455/41.3 |
| 2015/0147067 A1* | 5/2015 | Ryan | H04L 67/12 398/118 |
| 2015/0310188 A1* | 10/2015 | Ford | G06F 21/10 726/28 |
| 2016/0197648 A1* | 7/2016 | Paulson | H04B 11/00 455/41.1 |
| 2017/0041296 A1* | 2/2017 | Ford | G06F 21/64 |
| 2018/0063203 A1 | 3/2018 | Marella et al. | |
| 2018/0132298 A1 | 5/2018 | Birnam et al. | |
| 2018/0160282 A1* | 6/2018 | van de Poll | G06V 40/174 |
| 2018/0179670 A1* | 6/2018 | Ito | D06M 15/39 |
| 2018/0242154 A1* | 8/2018 | Ballard | H04L 61/5061 |
| 2018/0288811 A1* | 10/2018 | Witkowski | H04W 76/11 |
| 2018/0329676 A1* | 11/2018 | Williams | H04N 21/6581 |
| 2020/0014733 A1 | 1/2020 | Vanderheeren et al. | |
| 2020/0250246 A1* | 8/2020 | Meyer | H04L 67/5683 |
| 2020/0394332 A1* | 12/2020 | Jakobsson | G06F 16/24573 |

OTHER PUBLICATIONS

Texas Instruments, "Automating Bluetooth® Pairing With Near-Field Communications (NFC)", SLOA187A—Aug. 2013—Revised Mar. 2016, 13 pages.
Fabrice Punch, "NFC Pairing: More Time to Relax, Entertain, and Connect at Home", NXP Semiconductors, Apr. 4, 2016, 6 pages.
Martijn Bolhuis, "Using an NFC-equipped mobile phone as a token in physical access control", Nedap Securiy Management, Jul. 2, 2014, 130 pages.
Rawad Kilani et al., "Mobile Authentication with NFC enabled Smartphones", Aarhus University, ISSN: 2245-2087, Mar. 2013, 109 pages.
Qi Analytics LLC, "Talking Stick: Conversation Timer and Moderator for Apple TV", downloaded from the Internet May 6, 2021, 4 pages.
Android Developers, "NFC basics", Last updated Dec. 1, 2020, 20 pages; https://developer.android.com/guide/topics/connectivity/nfc/nfc.
NFC Forum, "NFC and Bluetooth: The Perfect Pair", Jul. 11, 2014, 6 pages; https://nfc-forum.org/nfc-and-bluetooth-the-perfect-pair/.
Wikipedia, "Near-field communication", last edited on May 6, 2021, 16 pages; https://en.wikipedia.org/wiki/Near-field_communication.
Webex, "Explore Your People Insights Profile in Webex Meetings and Webex Event (New)", Apr. 2, 2021, 2 pages.
Webex, "Learn More about Participants with People Insights", Oct. 19, 2020, 1 pages.
Wikipedia, "Hot desking", last edited on Dec. 11, 2020, 3 pages; https://en.wikipedia.org/wiki/Hot_desking.
Cisco, "CE9.12 Cisco Webex Desk Pro User Guide", Apr. 2020, 45 pages.

* cited by examiner

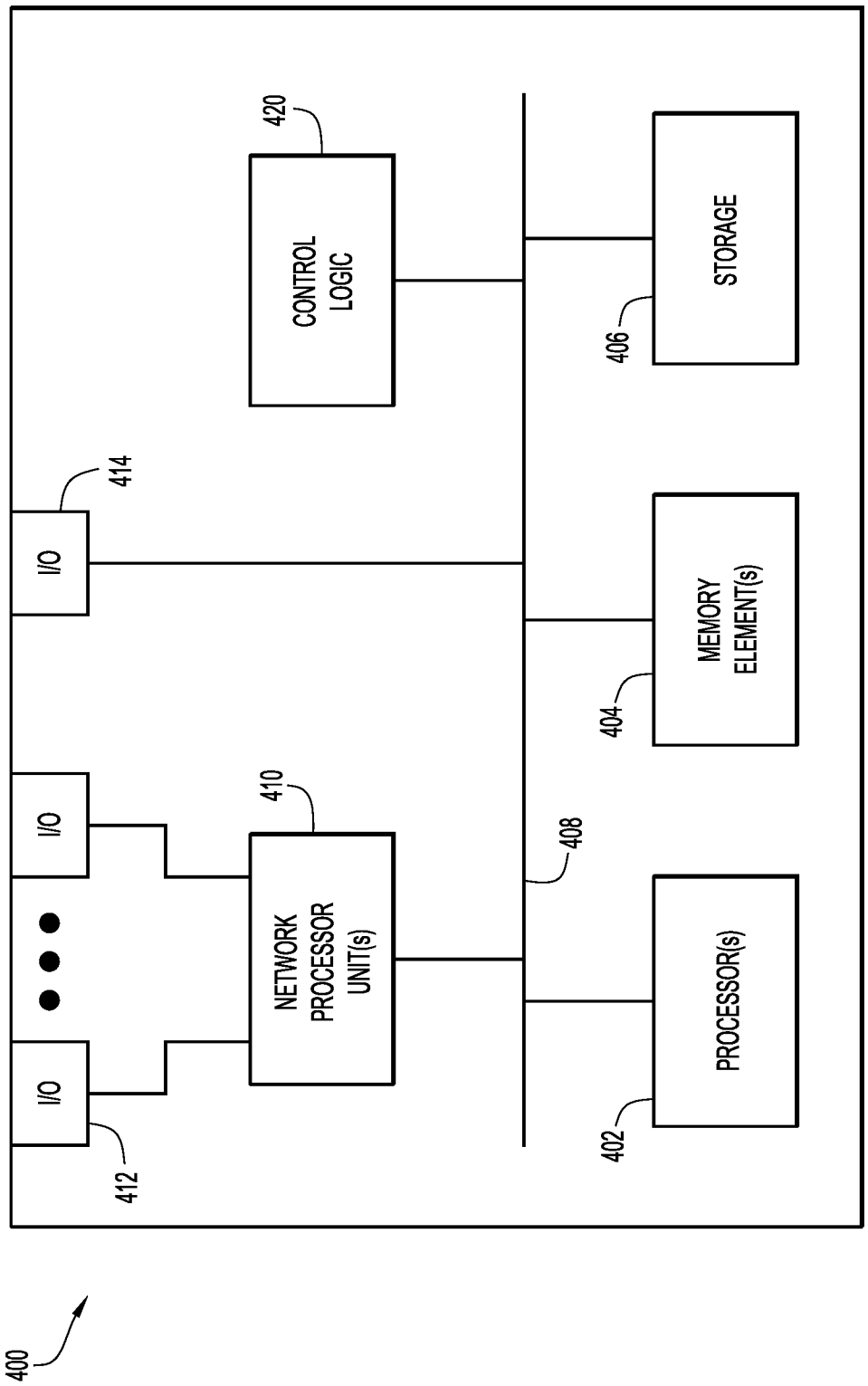

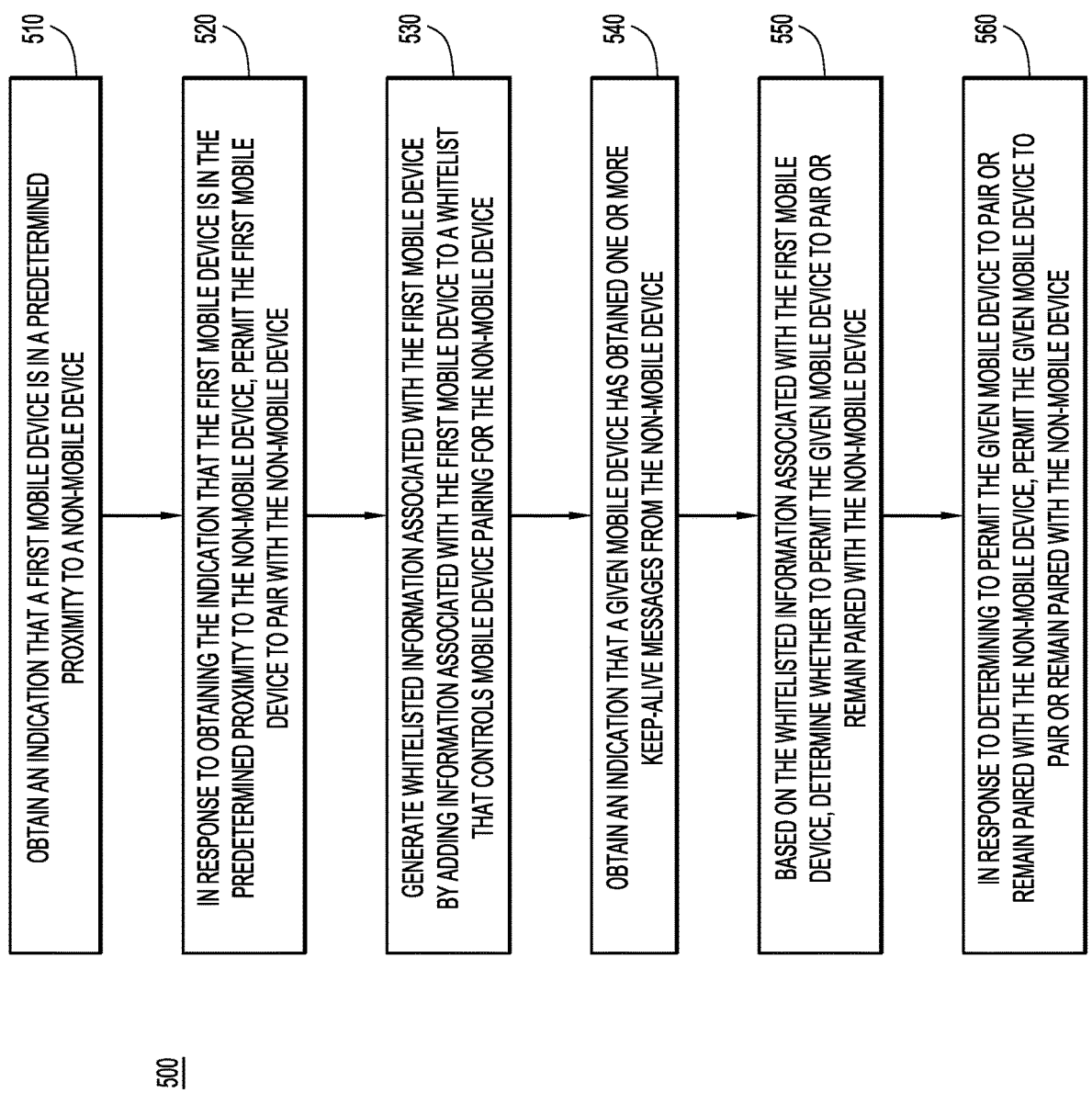

DEVICE PAIRING IN HOT DESKING ENVIRONMENTS

TECHNICAL FIELD

The present disclosure relates to computer networking.

BACKGROUND

"Hot desking" is a shared work space concept. It refers to an environment in which multiple workers can use the same work space (e.g., desk) in an office at different times. A hot desking environment can encourage collaboration among co-workers by offering flexible and dynamic seating arrangements. Enterprises that adopt hot desking environments can also experience significant real estate savings.

BRIEF DESCRIPTION OF THE DRAWINGS

FIG. 4 illustrates a hardware block diagram of a computing device configured to perform functions associated with operations discussed herein, according to an example embodiment.

FIG. 5 illustrates a flowchart of a method for performing functions associated with operations discussed herein, according to an example embodiment.

DESCRIPTION OF EXAMPLE EMBODIMENTS

Overview

Techniques are presented herein for device pairing in hot desking environments. In one example embodiment, a server obtains an indication that a first mobile device is in a predetermined proximity to a non-mobile device. In response to obtaining the indication that the first mobile device is in the predetermined proximity to the non-mobile device, the server permits the first mobile device to pair with the non-mobile device. The server generates whitelisted information associated with the first mobile device by adding information associated with the first mobile device to a whitelist that controls mobile device pairing for the non-mobile device. The server also obtains an indication that a given mobile device has obtained one or more keep-alive messages from the non-mobile device. Based on the whitelisted information associated with the first mobile device, the server determines whether to permit the given mobile device to pair or remain paired with the non-mobile device. In response to determining to permit the given mobile device to pair or remain paired with the non-mobile device, the server permits the given mobile device to pair or remain paired with the non-mobile device.

Example Embodiments

Figure 1:
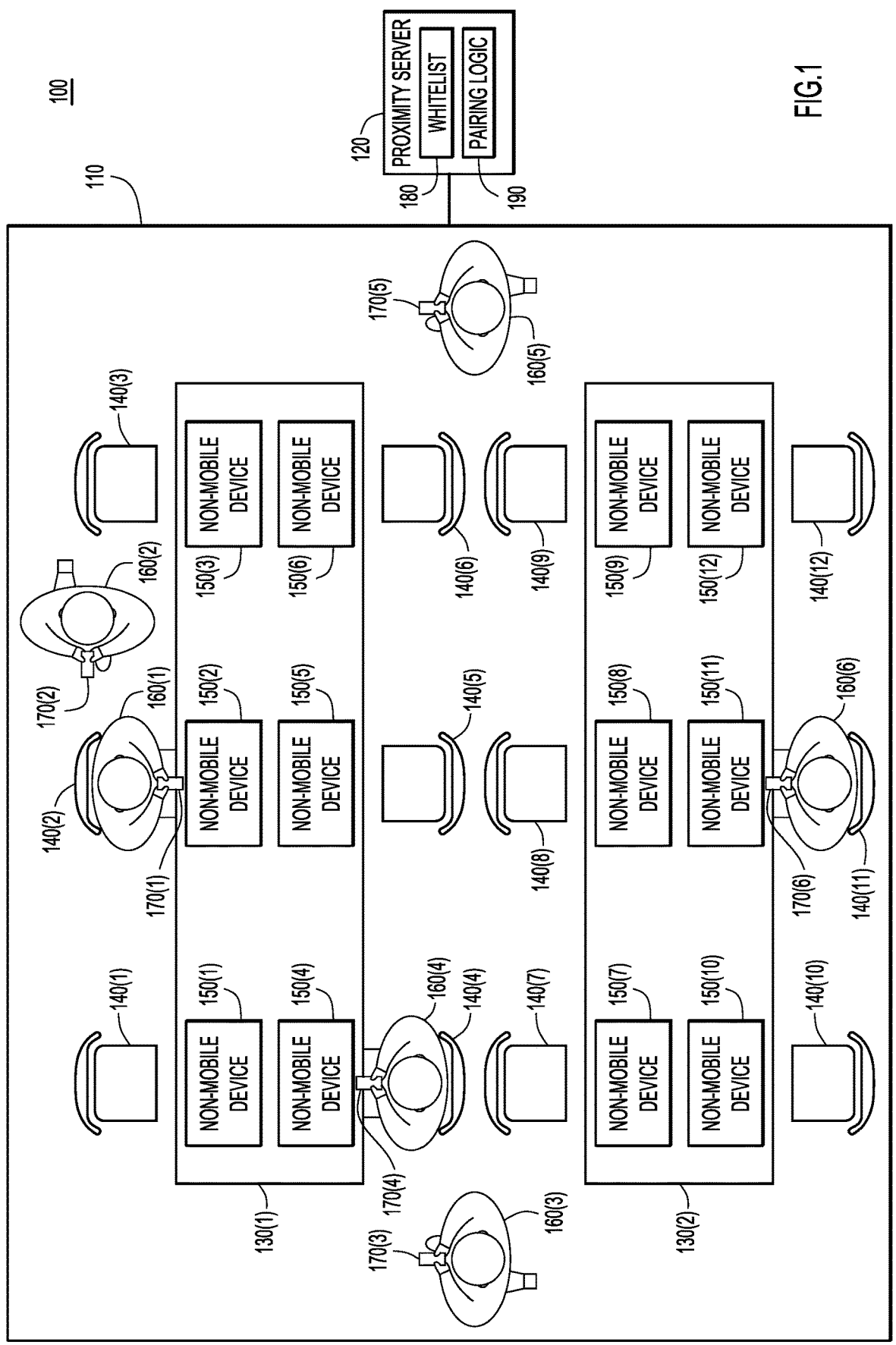
FIG. 1 illustrates a hot desking environment configured for device pairing, according to an example embodiment.

FIG. 1 illustrates a hot desking environment 100 configured for device pairing. Hot desking environment 100 includes open office 110 and proximity server 120. Open office 110 includes shared desk 130(1) and shared desk 130(2). As an example, shared desk 130(1) and shared desk 130(2) provide a total of twelve available work spaces, each including a respective chair 140(1)-140(12) and non-mobile device 150(1)-150(12). Non-mobile devices 150(1)-150(12) may be fixed desktop computer devices that integrate or connect to one or more respective keyboards, speakers, microphones, displays, cameras, and other suitable equipment.

Also shown are users 160(1)-160(6), some seated at shared desk 130(1) or shared desk 130(2) and some moving about open office 110. Specifically, users 160(1), 160(4), and 160(6) are seated in respective chairs 140(2), 140(4), and 140(11); users 160(2), 160(3), and 160(5) are not seated at a work space. Users 160(1)-160(6) each carry respective mobile devices 170(1)-170(6). Mobile devices 170(1)-170(6) are illustrated in FIG. 1 as smartphones, but it will be appreciated that mobile devices 170(1)-170(6) may include any suitable device, such as laptops, tablets, etc.

Proximity server 120 may be a cloud server configured to communicate with mobile devices 170(1)-170(6) and non-mobile devices 150(1)-150(12) in order to facilitate device pairing. Pairing permits proximity server 120 to associate one or more of mobile devices 170(1)-170(6) with one or more of non-mobile devices 150(1)-150(12). Pairing may provide many advantages in open office 110, such as verifying the presence of users 160(1)-160(6) and enabling remote access of features.

For hot desking environment 100 to be effective, non-mobile devices 150(1)-150(12) should pair with the appropriate mobile device 170(1)-170(6). For example, mobile device 170(1) should pair exclusively with non-mobile device 150(2), because user 160(1)—who is using mobile device 170(1)—is occupying the work space with non-mobile device 150(2). If non-mobile device 150(1) was to inadvertently pair with mobile device 170(1), then users 160(2)-160(6) might be precluded from using that work space.

Inadvertent pairing is likely to occur, for example, if non-mobile devices 150(1)-150(12) use ultrasound to pair initially with mobile devices 170(1)-170(6). Even if ultrasound signals emitted by non-mobile devices 150(1)-150(12) were lowered through volume adjustment, mobile device 170(1) could still pick up ultrasound pairing signals from, e.g., non-mobile devices 150(1)-150(6), rather than just non-mobile device 150(2).

Accordingly, to prevent such inadvertent pairing, proximity server 120 is provided with whitelist 180 and pairing logic 190. Pairing logic 190 may cause proximity server 120 to perform one or more operations involving whitelist 180 in order to prevent inadvertent pairing. In one example, ultrasound communications may be disabled on non-mobile devices 150(1)-150(12) before non-mobile devices 150(1)-150(12) have paired with one or more of mobile devices 170(1)-170(6). Instead of using ultrasound, non-mobile devices 150(1)-150(12) may employ a short-range technology, such as Near-Field Communications (NFC), to send out initial pairing messages. Unlike ultrasound, NFC may be sufficiently short-range to ensure that mobile device 170(1) detects an initial pairing message only from non-mobile device 150(2).

Proximity server 120 may obtain (e.g., from mobile device 170(1)) an indication that mobile device 170(1) is in a predetermined proximity to non-mobile device 150(2). In one example, the indication may be that mobile device 170(1) obtained an initial pairing message via the NFC while ultrasound communications on non-mobile device 150(2) are disabled. Other short-range technology, such as Universal Serial Bus type C (USB-C), may be used to trigger the initial pairing (e.g., by plugging a USB cable into a mobile phone or laptop). In response to obtaining the indication that mobile device 170(1) is in the predetermined proximity to non-mobile device 150(2), proximity server 120 may permit mobile device 170(1) to pair with non-mobile device 150(2).

While NFC may be used for the initial pairing message, using NFC for subsequent keep-alive messages is not a practical solution. Due to limitations in various mobile device operating systems, mobile device 170(1) would send only a single message to proximity server 120 in response to receiving an NFC keep-alive message, and that message would require manual trigger action. As a result, user 160(1) would need to touch/tap mobile device 170(1) every instance non-mobile device 150(2) sends out a pairing keep-alive message, or else the pairing would be dropped. But keep-alive messages may be sent relatively frequently (e.g., once a minute), which would require user 160(1) to interrupt their work to tap mobile device 170(1) far too often.

Therefore, NFC and other such single-shot pairing mechanisms are not adequate for maintaining a long-lived pairing once mobile device 170(1) has initially paired with non-mobile device 150(2). Instead, non-mobile device 150 (2) may use a different technology—one that does not require manual user taps—for the keep-alive messages. Ultrasound is one such technology. Accordingly, after the initial pairing has occurred, non-mobile device 150(2) may disable NFC and activate ultrasound communications for subsequent keep-alive messages.

However, simply moving from NFC to ultrasound would re-introduce the problem of inadvertent pairing. For example, ultrasound keep-alive messages sent out by non-mobile device 150(2) could invite mobile devices 170(2)-170(4) to pair with non-mobile device 150(2). Thus, in order to enable a practical pairing keep-alive mechanism while continuing to avoid inadvertent pairing, proximity server 120 generates whitelisted information associated with mobile device 170(1) by adding information associated with mobile device 170(1) to whitelist 180. Whitelist 180 may control mobile device pairing for non-mobile devices 150 (1)-150(12).

Some time (e.g., one minute) after the initial, single-shot trigger pairing has occurred, proximity server 120 may obtain an indication that mobile device 170(1) has obtained one or more keep-alive messages from non-mobile device 150(2). The indication may be that mobile device 170(1) has obtained the one or more keep-alive messages via the ultrasound communications while the NFC are disabled. Based on the whitelisted information associated with mobile device 170(1), proximity server 120 permits mobile device 170(1) to remain paired with non-mobile device 150(2).

This example prevents inadvertent pairing because whitelist 180 may control which mobile devices 170(1)-170 (6) are permitted to pair or remain paired with non-mobile devices 150(1)-150(12). For example, if proximity server 120 obtains an indication that mobile device 170(2) has obtained one or more keep-alive messages from non-mobile device 150(2), proximity server 120 may prevent mobile device 170(2) from pairing with non-mobile device 150(2) based on the information stored in whitelist 180. In particular, there is no whitelisted information indicating that mobile device 170(2) should be paired with non-mobile device 150(2) because mobile device 170(2) did not obtain the initial pairing message via NFC. Similarly, if mobile device 170(1) obtains one or more keep-alive messages from non-mobile device 170(4), proximity server 120 may prevent mobile device 170(1) from pairing with non-mobile device 150(4) because there is no whitelisted information indicating that mobile device 170(1) should be paired with non-mobile device 150(2). Thus, hot desking environment 100 enables intended device pairing while simultaneously preventing inadvertent device pairing.

Figure 2:
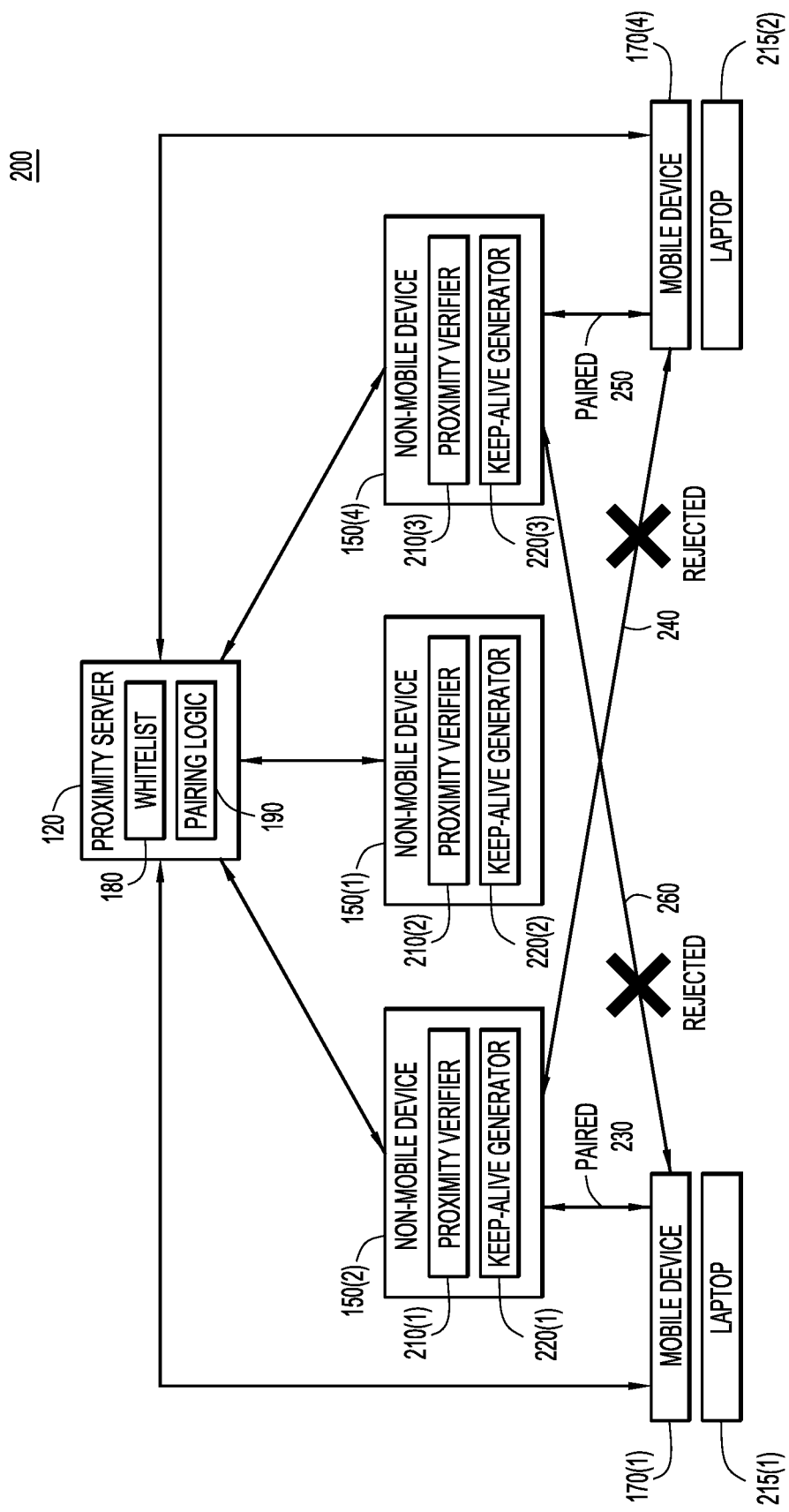
FIG. 2 illustrates a hot desking system configured for device pairing, according to an example embodiment.

With continued reference to FIG. 1, FIG. 2 illustrates an example hot desking system 200 configured for device pairing. Hot desking system 200 includes several components from hot desking environment 100, including proximity server 120, non-mobile device 150(1), non-mobile device 150(2), non-mobile device 150(4), mobile device 170(1), and mobile device 170(4). Non-mobile device 150 (2) includes proximity verifier 210(1) and keep-alive generator 220(1); non-mobile device 150(1) includes proximity verifier 210(2) and keep-alive generator 220(2); and non-mobile device 150(4) includes proximity verifier 210(3) and keep-alive generator 220(3). Hot desking system 200 also includes laptop 215(1) and laptop 215(2).

In one example, proximity verifiers 210(1)-210(3) may be respective NFC antennas/radios, and keep-alive generators 220(1)-220(3) may be respective ultrasound speakers. Thus, non-mobile device 150(1), non-mobile device 150(2), and non-mobile device 150(4) may each be configured for NFC and ultrasound communications. In a further example, non-mobile device 150(1), non-mobile device 150(2), and non-mobile device 150(4) each include a built-in charging dock configured to charge mobile device 170(1) and mobile device 170(4), and each charging dock may be located near the corresponding proximity verifier 210(1)-210(3).

Briefly, user 160(1) intends to pair mobile device 170(1) with non-mobile device 150(2), and user 160(4) intends to pair mobile device 170(4) with non-mobile device 150(4). After initial NFC pairing and log-in, mobile device 170(1) is paired with non-mobile device 150(2), and mobile device 170(4) is paired with non-mobile device 150(4). In addition, proximity server 120 may mark user 160(1) for non-mobile device 150(2), and user 160(4) for non-mobile device 150 (4), in whitelist 180. After the initial NFC pairing, non-mobile device 150(2) and non-mobile device 150(4) may enable ultrasound and begin sending keep-alive messages over ultrasound. However, whitelist 180 prevents mobile device 170(1) from pairing with non-mobile device 150(4), and further prevents mobile device 170(4) from pairing with non-mobile device 150(2). Moreover, neither mobile device 170(1) nor mobile device 170(4) pair to non-mobile device 150(1), as mobile device 170(1) and mobile device 170(4) are both out of range of proximity verifier 210(2). Thus, targeted device pairing is enabled. A detailed explanation follows.

Initially, mobile device 170(1) has not yet paired to non-mobile device 150(2), and mobile device 170(4) has not yet paired to non-mobile device 150(4). Thus, non-mobile device 150(1), non-mobile device 150(2), and non-mobile device 150(4) have ultrasound communications disabled and are sending out initial pairing messages via NFC. The initial pairing messages may include a NFC Data Exchange Format (NDEF) data tag. The NDEF data tags may in turn include a Uniform Resource Identifier (URI) that causes a software application to launch on mobile device 170(1) and mobile device 170(4). The NDEF data tag may also include an embedded, single-pairing token.

When user 160(1) places mobile device 170(1) on the charging dock of non-mobile device 150(2), mobile device 170(1) is within a physical range of proximity verifier 210(1) that is sufficient to detect the initial pairing messages sent from proximity verifier 210(1). Upon detecting an initial pairing message from proximity verifier 210(1), mobile device 170(1) identifies and extracts the embedded token. The initial pairing message causes mobile device 170(1) to open a software application that enables communication with proximity server 120. Mobile device 170(1) may prompt user 160(1) to tap a touch screen of mobile device 170(1). When mobile device 170(1) detects the tap, mobile device 170(1) sends the token to proximity server 120.

Proximity server 120 may obtain an indication that mobile device 170(1) is within a predetermined proximity to non-mobile device 150(2). The predetermined proximity may be within the range of proximity verifier 210(1) (e.g., an NFC antenna), and the indication may be the token that proximity server 120 receives from mobile device 170(1). In response to obtaining the indication (e.g., the token), proximity server 120 permits mobile device 170(1) to pair with non-mobile device 150(2), as represented by arrow 230.

Mobile device 170(1) may prompt user 160(1) for log-in credentials. In one example, the log-in credentials may be assigned by an enterprise employing user 160(1). Mobile device 170(1) may obtain the log-in credentials from user 160(1) and forward the log-in credentials to proximity server 120. Proximity server 120 may obtain the log-in credentials, and, in response, generate whitelisted information associated with mobile device 170(1) by adding information associated with mobile device 170(1) to whitelist 180. Proximity server 120 may also/alternatively examine other policies and/or attributes of user 160(1) before permitting the hot desking/pairing flow to proceed. For example, proximity server 120 may prepopulate the whitelist (e.g., based on a remote reservation) or perform a check to determine whether the enterprise employing user 160(1) matches the organization to which non-mobile device 150(2) belongs. The whitelisted information may include any suitable information associated with mobile device 170(1). In one example, the whitelisted information may include a user identifier that is assigned by the enterprise employing user 160(1). The user identifier may be associated with the log-in credentials. In a further example, only one user identifier may be whitelisted for non-mobile device 150(2) at any given time.

Once non-mobile device 150(2) has successfully paired with mobile device 170(1), non-mobile device 150(2) disables NFC and activates ultrasound communications. In one example, non-mobile device 150(2) emits an ultrasound keep-alive message once a minute. Each ultrasound keep-alive message may include a token. A given mobile device may detect one or more ultrasound keep-alive messages sent from non-mobile device 150(2), extract the token, and forward the token to proximity server 120.

Proximity server 120 may obtain an indication that the given mobile device has obtained one or more keep-alive messages from non-mobile device 150(2) (e.g., by receiving the ultrasound token from the given mobile device). Based on the whitelisted information associated with mobile device 170(1), proximity server 120 may determine whether to permit the given mobile device to pair or remain paired with the non-mobile device.

For example, if proximity server 120 obtains an indication that mobile device 170(1) has obtained one or more keep-alive messages from non-mobile device 150(2), proximity server 120 may permit mobile device 170(1) to remain paired with non-mobile device 150(2). But if proximity server 120 obtains an indication that mobile device 170(4) has obtained one or more keep-alive messages from non-mobile device 150(2), proximity server 120 may prevent mobile device 170(4) from pairing with non-mobile device 150(2), as represented by arrow 240.

In another example, proximity server 120 may determine whether the given mobile device is associated with user 160(1) based on the whitelisted information associated with mobile device 170(1). If so, proximity server 120 may permit the given mobile device to remain paired with non-mobile device 150(2). For instance, user 160(1) might initially pair with mobile device 170(1) (including performing the one-time manual action, e.g. tap), and during the same pairing session begin using laptop 215(1). Laptop 215(1) may be associated with (e.g., owned or used by) user 160(1). In that case, proximity server 120 may permit laptop 215(1) to automatically pair via the keep-alive messages without requiring user 160(1) to perform an additional manual action for laptop 215(1).

Proximity server 120 may determine that both laptop 215(1) and mobile device 170(1) are associated with the whitelisted user identifier based on predetermined information (e.g., a database) associating the user identifier with laptop 215(1) and mobile device 170(1). Alternatively, user 160(1) may be prompted to provide some sort of proof that laptop 215(1) is associated with the user identifier (e.g., by providing log-in credentials). In any event, when proximity server 120 adds the user identifier to whitelist 180, all mobile devices associated with user 160(1) (e.g., mobile device 170(1), laptop 215(1), etc.) are effectively whitelisted, too. Thus, little or no manual action may be needed to pair additional mobile devices to non-mobile device 150(2), so long as the user identifier remains whitelisted.

In a further example, proximity server 120 may obtain a log-out request from mobile device 170(1) (or another mobile device associated with user 160(1), such as laptop 215(1)). Proximity server 120 may also/alternatively obtain the log-out request from non-mobile device 150(2). In response, proximity server 120 may remove the information associated with mobile device 170(1) from whitelist 180. Proximity server 120 may retain the whitelisted information until user 160(1) logs out, even if user 160(1) carries mobile device 170(1) outside the range of keep-alive generator 220(1).

For example, if user 160(1) moves mobile device 170(1) to a conference room for a meeting before logging out of non-mobile device 150(2), non-mobile device 150(2) may continue sending out periodic keep-alive messages. Non-mobile device 150(2) continues sending out the keep-alive messages because user 160(1) remains logged-in and whitelisted for non-mobile device 150(2). Meanwhile, mobile device 170(1) may pair with other devices, such as a smart board in the conference room. After the meeting, user 160(1) may return mobile device 170(1) to the vicinity of non-mobile device 150(2). Because the user identifier of user 160(1) is still whitelisted, mobile device 170(1) may quickly re-pair with non-mobile device 150(2). In particular, mobile device 170(1) may extract a token from a periodic ultrasound keep-alive message obtained from non-mobile device 150(2), and provide the token to proximity server 120.

Thus, whitelist 180 may be controlled based on whether user 160(1) is logged in. In addition to removing the user identifier from whitelist 180 when user 160(1) logs out, proximity server 120 may also automatically log out user 160(1) at a specific time of day (e.g., after the work day has ended) or after being logged in for a given length of time (e.g., four hours, a full work day, etc.). This may enable other users (e.g., users 160(2)-160(6)) to use non-mobile device 150(2) the following day even if user 160(1) forgot to log out at the end of the previous day.

Similar operations may apply to mobile device 170(4) and non-mobile device 150(4). When user 160(4) places mobile device 170(4) on the charging dock of non-mobile device 150(4), mobile device 170(4) is within a physical range of proximity verifier 210(4) that is sufficient to detect the initial pairing messages sent from proximity verifier 210(4). Upon detecting an initial pairing message from proximity verifier 210(4), mobile device 170(4) identifies and extracts the embedded token. The initial pairing message causes mobile device 170(4) to open a software application that enables communication with proximity server 120. Mobile device 170(4) may prompt user 160(4) to tap a touch screen of mobile device 170(4). When mobile device 170(4) detects the tap, mobile device 170(4) sends the token to proximity server 120.

Proximity server 120 may obtain an indication that mobile device 170(4) is within a predetermined proximity to non-mobile device 150(4). The predetermined proximity may be within the range of proximity verifier 210(4) (e.g., an NFC antenna), and the indication may be the token that proximity server 120 receives from mobile device 170(4). In response to obtaining the indication (e.g., the token), proximity server 120 permits mobile device 170(4) to pair with non-mobile device 150(4), as represented by arrow 250.

Mobile device 170(4) may prompt user 160(4) for log-in credentials. In one example, the log-in credentials may be assigned by an enterprise employing user 160(4). Mobile device 170(4) may obtain the log-in credentials from user 160(4) and forward the log-in credentials to proximity server 120. Proximity server 120 may obtain the log-in credentials, and, in response, generate whitelisted information associated with mobile device 170(4) by adding information associated with mobile device 170(4) to whitelist 180. Proximity server 120 may also/alternatively examine other policies and/or attributes of user 160(4) before permitting the hot desking/pairing flow to proceed. For example, proximity server 120 may prepopulate the whitelist (e.g., based on a remote reservation) or perform a check to determine whether the enterprise employing user 160(4) matches the organization to which non-mobile device 150(4) belongs. The whitelisted information may include any suitable information associated with mobile device 170(4). In one example, the whitelisted information may include a user identifier that is assigned by the enterprise employing user 160(4). The user identifier may be associated with the log-in credentials. In a further example, only one user identifier may be whitelisted for non-mobile device 150(4) at any given time.

Once non-mobile device 150(4) has successfully paired with mobile device 170(4), non-mobile device 150(4) disables NFC and activates ultrasound communications. In one example, non-mobile device 150(4) emits an ultrasound keep-alive message once a minute. Each ultrasound keep-alive message may include a token. A given mobile device may detect one or more ultrasound keep-alive messages sent from non-mobile device 150(4), extract the token, and forward the token to proximity server 120.

Proximity server 120 may obtain an indication that the given mobile device has obtained one or more keep-alive messages from non-mobile device 150(4) (e.g., by receiving the ultrasound token from the given mobile device). Based on the whitelisted information associated with mobile device 170(4), proximity server 120 may determine whether to permit the given mobile device to pair or remain paired with the non-mobile device.

For example, if proximity server 120 obtains an indication that mobile device 170(4) has obtained one or more keep-alive messages from non-mobile device 150(4), proximity server 120 may permit mobile device 170(4) to remain paired with non-mobile device 150(4). But if proximity server 120 obtains an indication that mobile device 170(1) has obtained one or more keep-alive messages from non-mobile device 150(4), proximity server 120 may prevent mobile device 170(1) from pairing with non-mobile device 150(4), as represented by arrow 260.

In another example, proximity server 120 may determine whether the given mobile device is associated with user 160(4) based on the whitelisted information associated with mobile device 170(4). If so, proximity server 120 may permit the given mobile device to remain paired with non-mobile device 150(4). For instance, user 160(4) might initially pair with mobile device 170(4) (including performing the one-time manual action, e.g. tap), and during the same pairing session begin using laptop 215(2). Laptop 215(2) may be associated with (e.g., owned or used by) user 160(4). In that case, proximity server 120 may permit laptop 215(2) to automatically pair via the keep-alive messages without requiring user 160(4) to perform an additional manual action for laptop 215(2).

Proximity server 120 may determine that both laptop 215(2) and mobile device 170(4) are associated with the whitelisted user identifier based on predetermined information (e.g., a database) associating the user identifier with laptop 215(2) and mobile device 170(4). Alternatively, user 160(4) may be prompted to provide some sort of proof that laptop 215(2) is associated with the user identifier (e.g., by providing log-in credentials). In any event, when proximity server 120 adds the user identifier to the whitelist, all mobile devices associated with user 160(4) (e.g., mobile device 170(4), laptop 215(2), etc.) are effectively whitelisted, too. Thus, little or no manual action may be needed to pair additional mobile devices to non-mobile device 150(4), so long as the user identifier remains whitelisted.

In a further example, proximity server 120 may obtain a log-out request from mobile device 170(4) (or another mobile device associated with user 160(4), such as laptop 215(2)). Proximity server 120 may also/alternatively obtain the log-out request from non-mobile device 150(4). In response, proximity server 120 may remove the information associated with mobile device 170(4) from whitelist 180. Proximity server 120 may retain the whitelisted information until user 160(4) logs out, even if user 160(4) carries mobile device 170(4) outside the range of keep-alive generator 220(1).

For example, if user 160(4) moves mobile device 170(4) to a conference room for a meeting before logging out of non-mobile device 150(4), non-mobile device 150(4) may continue sending out periodic keep-alive messages. Non-mobile device 150(4) continues sending out the keep-alive messages because user 160(4) remains logged-in and whitelisted for non-mobile device 150(4). Meanwhile, mobile device 170(4) may pair with other devices, such as a smart board in the conference room. After the meeting, user 160(4) may return mobile device 170(4) to the vicinity of non-mobile device 150(4). Because the user identifier of user 160(4) is still whitelisted, mobile device 170(4) may quickly re-pair with non-mobile device 150(4). In particular, mobile device 170(4) may extract a token from a periodic ultrasound keep-alive message obtained from non-mobile device 150(4), and provide the token to proximity server 120.

Thus, whitelist 180 may be controlled based on whether user 160(4) is logged in. In addition to removing the user identifier from whitelist 180 when user 160(4) logs out, proximity server 120 may also log out user 160(4) at a specific time of day (e.g., after the work day has ended) or after being logged in for a given length of time (e.g., four hours, a full work day, etc.). This may enable other users (e.g., users 160(1)-160(3), 160(5), and 160(6)) to use non-mobile device 150(4) the following day even if user 160(4) forgot to log out at the end of the previous day.

While NFC is used in the specific examples described above, any suitable technology may be utilized for the initial pairing message. For example, a QR code may be used in place of NFC. Like NFC, the QR code is a one-shot mechanism with an associated manual user action. A QR code may be displayed on a display (e.g., screen) of a non-mobile device. The user may manually take a snapshot of the QR code with a camera of a mobile device, which prompts the mobile device to launch the software application based on a URI of the QR code, extract a token from the QR code, and pass the token to a proximity server for targeted pairing.

Another alternative to NFC is requiring the user to enter a user identifier and password, or a Personal Identification Number (PIN) as part of a manual pair PIN challenge. If the mobile device is a laptop, the non-mobile device may provide the initial token to the laptop over a physical connection, such as a USB cable. Any suitable mechanism may be used to demonstrate that the mobile device is in a predetermined proximity to the non-mobile device. Similarly, any suitable technology may be used for the keep-alive messages, such as Bluetooth® wireless technology. Furthermore, any suitable number and type of mobile devices and non-mobile devices may be compatible with the techniques described herein.

Figure 3:
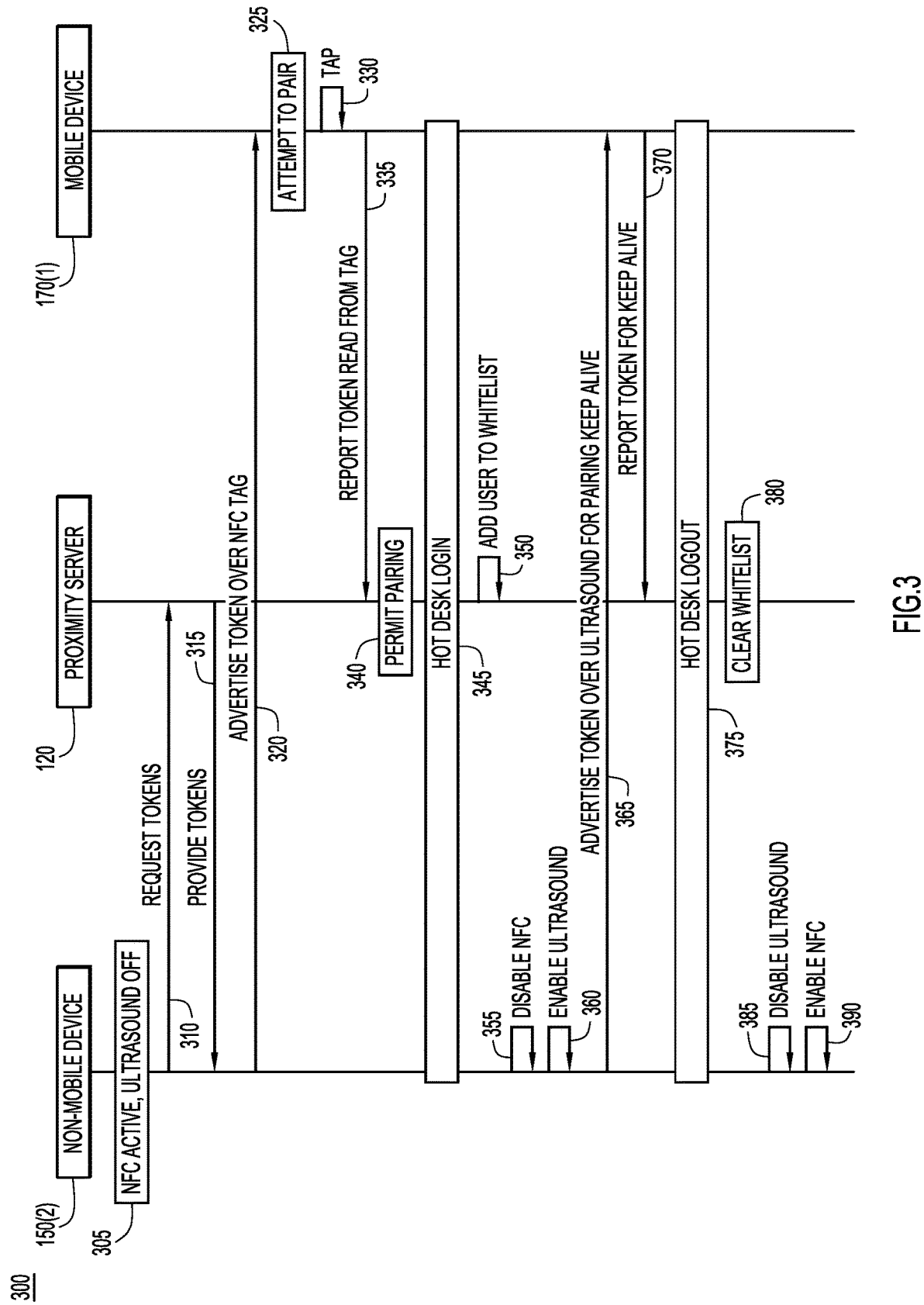
FIG. 3 illustrates a sequence diagram of a method for device pairing in a hot desking environment, according to an example embodiment.

With continued reference to FIG. 1, FIG. 3 illustrates a sequence diagram of an example method 300 for device pairing in hot desking environment 100. Briefly, method 300 enables mobile device 170(1) to pair with the non-mobile device with which user 160(1) has initiated a hot desk operation—here, non-mobile device 150(2). Method 300 prevents mobile device 170(1) from pairing with neighboring non-mobile devices (e.g., non-mobile device 150(1) and non-mobile devices 150(3)-150(12)), and also prevents neighboring non-mobile devices from pairing with mobile device 170(1). Thus, once user 160(1) has initiated a pairing operation with non-mobile device 150(2) and hot desking is active, proximity server 120 may manage subsequent pairing to limit pairing operations with other devices.

At operation 305, NFC is active and ultrasound pairing is disabled by default on non-mobile device 150(2). At operation 310, proximity server 120 obtains, from non-mobile device 150(2), a request for one or more pairing tokens. At operation 315, proximity server 120 provides the requested token(s) to non-mobile device 150(2).

At operation 320, non-mobile device 150(2) advertises the requested token(s) over an NFC tag. At operation 325, mobile device 170(1) detects the advertisement and attempts to pair with non-mobile device 150(2). In this example, mobile device 170(1) prompts user 160(1) to tap a touchscreen of mobile device 170(1). At operation 330, mobile device 170(1) receives a tap from user 160(1). At operation 335, mobile device 170(1) reports, to proximity server 120, the token(s) read from the NFC tag. At operation 340, proximity server 120 permits mobile device 170(1) to pair with non-mobile device 150(2).

Operation 345 is a hot desk log-in operation. In one example, user 160(1) inputs log-in credentials to mobile device 170(1), and those credentials are shared with proximity server 120 and/or non-mobile device 150(2). The credentials may be a user identifier and password, or an access token shared by mobile device 170(1) to permit non-mobile device 150(2) to invoke operations on behalf of user 160(1). At operation 350, proximity server 120 adds user 160(1) to whitelist 180. This signals that user 160(1), who initiated the first pairing with non-mobile device 150(2), is permitted to pair with non-mobile device 150(2) over ultrasound.

Using whitelist 180, proximity server 120 may prevent other mobile devices from spuriously pairing with non-mobile device 150(2) over ultrasound. Whitelist 180 may thus serve as a cloud proximity allow list that enables proximity server 120 to prevent mobile devices from ultrasound-pairing with non-mobile device 150(2), unless those mobile devices are associated with the user identifier of user 160(1). Mobile device 170(1) may also avoid spuriously pairing with nearby non-mobile devices that have not yet been hot desked (e.g., are still in NFC-only mode), because those non-mobile devices have disabled ultrasound communications. However, mobile device 170(1) may be permitted to pair with non-mobile device 150(2) because user 160(1) is whitelisted.

After the initial NFC-based pairing, and after user 160(1) has hot-desked onto non-mobile device 150(2), non-mobile device 150(2) may disable NFC (operation 355) and enable ultrasound communications (operation 360) for pairing keep-alive messages. Disabling NFC (e.g., disabling the NFC antenna) may prevent spurious NFC wake-ups, and activating ultrasound may enable transmission of proximity tokens via ultrasound.

At operation 365, non-mobile device 150(2) advertises a keep-alive proximity token over ultrasound. A software application on mobile device 170(1) may listen for the token to keep the pairing alive. At operation 370, mobile device 170(1) reports the keep-alive token to proximity server 120. Proximity server 120 thus keeps the pairing alive. If any mobile device that is not associated with the user identifier hears the ultrasound token and reports the token to proximity server 120, proximity server 120 may prevent that mobile device from pairing with non-mobile device 150(2) due to the information stored on whitelist 180. Operation 365 and operation 370 may repeat for the duration of the hot-desking session. For example, operation 365 and operation 370 may repeat periodically (e.g., every minute).

Operation 375 is a hot desk log-out operation. In one example, user 160(1) may explicitly end the pairing session by logging out of non-mobile device 150(2). At operation 380, proximity server 120 clears the user identifier from whitelist 180 so that any mobile device—regardless of the associated user identifier—is permitted to pair with non-mobile device 150(2). At operation 385, non-mobile device 150(2) disables ultrasound playout, and at operation 390, non-mobile device 150(2) re-enables the NFC antenna. Thus, non-mobile device 150(2) is reset for the next hot-desk user.

Referring to FIG. 4, FIG. 4 illustrates a hardware block diagram of a computing device 400 that may perform functions associated with operations discussed herein in connection with the techniques depicted in FIGS. 1-3. In various embodiments, a computing device, such as computing device 400 or any combination of computing devices 400, may be configured as any entity/entities as discussed for the techniques depicted in connection with FIGS. 1-3 in order to perform operations of the various techniques discussed herein.

In at least one embodiment, computing device 400 may include one or more processor(s) 402, one or more memory element(s) 404, storage 406, a bus 408, one or more network processor unit(s) 410 interconnected with one or more network input/output (I/O) interface(s) 412, one or more I/O interface(s) 414, and control logic 420. In various embodiments, instructions associated with logic for computing device 400 can overlap in any manner and are not limited to the specific allocation of instructions and/or operations described herein.

In at least one embodiment, processor(s) 402 is/are at least one hardware processor configured to execute various tasks, operations and/or functions for computing device 400 as described herein according to software and/or instructions configured for computing device 400. Processor(s) 402 (e.g., a hardware processor) can execute any type of instructions associated with data to achieve the operations detailed herein. In one example, processor(s) 402 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 404 and/or storage 406 is/are configured to store data, information, software, and/or instructions associated with computing device 400, and/or logic configured for memory element(s) 404 and/or storage 406. For example, any logic described herein (e.g., control logic 420) can, in various embodiments, be stored for computing device 400 using any combination of memory element(s) 404 and/or storage 406. Note that in some embodiments, storage 406 can be consolidated with memory elements 404 (or vice versa), or can overlap/exist in any other suitable manner.

In at least one embodiment, bus 408 can be configured as an interface that enables one or more elements of computing device 400 to communicate in order to exchange information and/or data. Bus 408 can be implemented with any architecture designed for passing control, data and/or information between processors, memory elements/storage, peripheral devices, and/or any other hardware and/or software components that may be configured for computing device 400. In at least one embodiment, bus 408 may be implemented as a fast kernel-hosted interconnect, potentially using shared memory between processes (e.g., logic), which can enable efficient communication paths between the processes.

In various embodiments, network processor unit(s) 410 may enable communication between computing device 400 and other systems, entities, etc., via network I/O interface(s) 412 to facilitate operations discussed for various embodiments described herein. In various embodiments, network processor unit(s) 410 can be configured as a combination of hardware and/or software, such as one or more Ethernet driver(s) and/or controller(s) or interface cards, Fibre Channel (e.g., optical) driver(s) and/or controller(s), and/or other similar network interface driver(s) and/or controller(s) now known or hereafter developed to enable communications between computing device 400 and other systems, entities, etc. to facilitate operations for various embodiments described herein. In various embodiments, network I/O interface(s) 412 can be configured as one or more Ethernet port(s), Fibre Channel ports, and/or any other I/O port(s) now known or hereafter developed. Thus, the network processor unit(s) 410 and/or network I/O interfaces 412 may include suitable interfaces for receiving, transmitting, and/or otherwise communicating data and/or information in a network environment.

I/O interface(s) 414 allow for input and output of data and/or information with other entities that may be connected to computing device 400. For example, I/O interface(s) 414 may provide a connection to external devices such as a keyboard, keypad, a touch screen, and/or any other suitable input device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 420 can include instructions that, when executed, cause processor(s) 402 to perform operations, which can include, but not be limited to, providing overall control operations of computing device 400; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 420) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, Random Access Memory (RAM), Read Only Memory (ROM), Erasable Programmable ROM (EPROM), Application Specific Integrated Circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, Digital Signal Processing (DSP) instructions, software [potentially inclusive of object code and source code], etc.) for execution by one or more processor(s), and/or other similar machine, etc. Generally, memory element(s) 404 and/or storage 406 can store data, software, code, instructions (e.g., processor instructions), logic, parameters, combinations thereof, and/or the like used for operations described herein. This includes memory elements 404 and/or storage 406 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, Compact Disc ROM (CD-ROM), Digital Versatile Disc (DVD), memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to computing device 400 for transfer onto another computer readable storage medium.

FIG. 5 is a flowchart of an example method 500 for performing functions associated with operations discussed herein. Method 500 may be performed by any suitable entity, such as proximity server 120. At operation 510, proximity server 120 obtains an indication that a first mobile device is in a predetermined proximity to a non-mobile device. At operation 520, in response to obtaining the indication that the first mobile device is in the predetermined proximity to the non-mobile device, proximity server 120 permits the first mobile device to pair with the non-mobile device.

At operation 530, proximity server 120 generates whitelisted information associated with the first mobile device by adding information associated with the first mobile device to a whitelist that controls mobile device pairing for the non-mobile device. At operation 540, proximity server 120 obtains an indication that a given mobile device has obtained one or more keep-alive messages from the non-mobile device. At operation 550, based on the whitelisted information associated with the first mobile device, proximity server 120 determines whether to permit the given mobile device to pair or remain paired with the non-mobile device. At operation 560, in response to determining to permit the given mobile device to pair or remain paired with the non-mobile device, proximity server 120 permits the given mobile device to pair or remain paired with the non-mobile device.

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any Local Area Network (LAN), Virtual LAN (VLAN), Wide Area Network (WAN) (e.g., the Internet), Software Defined WAN (SD-WAN), Wireless Local Area (WLA) access network, Wireless Wide Area (WWA) access network, Metropolitan Area Network (MAN), Intranet, Extranet, Virtual Private Network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fib®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may be directly or indirectly connected utilizing any algorithms, communication protocols, interfaces, etc. (proprietary and/or non-proprietary) that allow for the exchange of data and/or information.

In various example implementations, entities for various embodiments described herein can encompass network elements (which can include virtualized network elements, functions, etc.) such as, for example, network appliances, forwarders, routers, servers, switches, gateways, bridges, load-balancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

In one form, a method is provided. The method comprises: obtaining an indication that a first mobile device is in a predetermined proximity to a non-mobile device; in response to obtaining the indication that the first mobile device is in the predetermined proximity to the non-mobile device, permitting the first mobile device to pair with the non-mobile device; generating whitelisted information associated with the first mobile device by adding information associated with the first mobile device to a whitelist that controls mobile device pairing for the non-mobile device; obtaining an indication that a given mobile device has obtained one or more keep-alive messages from the non-mobile device; based on the whitelisted information associated with the first mobile device, determining whether to permit the given mobile device to pair or remain paired with the non-mobile device; and in response to determining to permit the given mobile device to pair or remain paired with the non-mobile device, permitting the given mobile device to pair or remain paired with the non-mobile device.

In one example, the method further comprises: in response to determining not to permit the given mobile device to pair or remain paired with the non-mobile device, preventing the given mobile device from pairing with the non-mobile device.

In one example, the given mobile device is the first mobile device, and permitting the given mobile device to pair or remain paired with the non-mobile device includes permitting the first mobile device to remain paired with the non-mobile device.

In one example, the given mobile device is a second mobile device, and generating the whitelisted information associated with the first mobile device includes generating whitelisted information identifying a user associated with the first mobile device; determining whether to permit the given mobile device to pair or remain paired with the non-mobile device includes determining whether the second mobile device is associated with the user; and permitting the given mobile device to pair or remain paired with the non-mobile device includes permitting the second mobile device to pair with the non-mobile device.

In one example, the method further comprises: obtaining log-in credentials of a user associated with the first mobile device, wherein generating the whitelisted information associated with the first mobile device includes generating the whitelisted information associated with the first mobile device in response to obtaining the log-in credentials.

In one example, the method further comprises: obtaining a log-out request; and in response to obtaining the log-out request, removing the information associated with the first mobile device from the whitelist.

In one example, the non-mobile device is configured for near-field communications and ultrasound communications, and obtaining the indication that the first mobile device is in the predetermined proximity to the non-mobile device includes obtaining an indication that the first mobile device obtained an initial pairing message via the near-field communications while the ultrasound communications are disabled; and obtaining the indication that the given mobile device has obtained the one or more keep-alive messages includes obtaining the indication that the given mobile device has obtained the one or more keep-alive messages via the ultrasound communications while the near-field communications are disabled.

In another form, an apparatus is provided. The apparatus comprises: a network interface configured to obtain or provide network communications; and one or more processors coupled to the network interface, wherein the one or more processors are configured to: obtain an indication that a first mobile device is in a predetermined proximity to a non-mobile device; in response to obtaining the indication that the first mobile device is in the predetermined proximity to the non-mobile device, permit the first mobile device to pair with the non-mobile device; generate whitelisted information associated with the first mobile device by adding information associated with the first mobile device to a whitelist that controls mobile device pairing for the non-mobile device; obtain an indication that a given mobile device has obtained one or more keep-alive messages from the non-mobile device; based on the whitelisted information associated with the first mobile device, determine whether to permit the given mobile device to pair or remain paired with the non-mobile device; and in response to determining to permit the given mobile device to pair or remain paired with the non-mobile device, permit the given mobile device to pair or remain paired with the non-mobile device.

In another form, one or more non-transitory computer readable storage media are provided. The non-transitory computer readable storage media are encoded with instructions that, when executed by a processor, cause the processor to: obtain an indication that a first mobile device is in a predetermined proximity to a non-mobile device; in response to obtaining the indication that the first mobile device is in the predetermined proximity to the non-mobile device, permit the first mobile device to pair with the non-mobile device; generate whitelisted information associated with the first mobile device by adding information associated with the first mobile device to a whitelist that controls mobile device pairing for the non-mobile device; obtain an indication that a given mobile device has obtained one or more keep-alive messages from the non-mobile device; based on the whitelisted information associated with the first mobile device, determine whether to permit the given mobile device to pair or remain paired with the non-mobile device; and in response to determining to permit the given mobile device to pair or remain paired with the non-mobile device, permit the given mobile device to pair or remain paired with the non-mobile device.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
    obtaining an indication that a first mobile device is in a predetermined proximity to a non-mobile device;
    in response to obtaining the indication that the first mobile device is in the predetermined proximity to the non-mobile device, permitting the first mobile device to pair with the non-mobile device;
    generating whitelisted information associated with the first mobile device by adding information associated with the first mobile device to a whitelist that controls mobile device pairing for the non-mobile device;
    obtaining an indication that a given mobile device has obtained one or more keep-alive messages from the non-mobile device;
    based on the whitelisted information associated with the first mobile device, determining whether to permit the given mobile device to pair or remain paired with the non-mobile device; and
    in response to determining to permit the given mobile device to pair or remain paired with the non-mobile device, permitting the given mobile device to pair or remain paired with the non-mobile device.

2. The method of claim 1, further comprising:
    in response to determining not to permit the given mobile device to pair or remain paired with the non-mobile device, preventing the given mobile device from pairing with the non-mobile device.

3. The method of claim 1, wherein the given mobile device is the first mobile device, and wherein:
    permitting the given mobile device to pair or remain paired with the non-mobile device includes permitting the first mobile device to remain paired with the non-mobile device.

4. The method of claim 1, wherein the given mobile device is a second mobile device, and wherein:
    generating the whitelisted information associated with the first mobile device includes generating whitelisted information identifying a user associated with the first mobile device;
    determining whether to permit the given mobile device to pair or remain paired with the non-mobile device includes determining whether the second mobile device is associated with the user; and
    permitting the given mobile device to pair or remain paired with the non-mobile device includes permitting the second mobile device to pair with the non-mobile device.

5. The method of claim 1, further comprising:
    obtaining log-in credentials of a user associated with the first mobile device, wherein
    generating the whitelisted information associated with the first mobile device includes generating the whitelisted information associated with the first mobile device in response to obtaining the log-in credentials.

6. The method of claim 1, further comprising:
    obtaining a log-out request; and
    in response to obtaining the log-out request, removing the information associated with the first mobile device from the whitelist.

7. The method of claim 1, wherein the non-mobile device is configured for near-field communications and ultrasound communications, and wherein:
    obtaining the indication that the first mobile device is in the predetermined proximity to the non-mobile device includes obtaining an indication that the first mobile device obtained an initial pairing message via the near-field communications while the ultrasound communications are disabled; and
    obtaining the indication that the given mobile device has obtained the one or more keep-alive messages includes obtaining the indication that the given mobile device has obtained the one or more keep-alive messages via the ultrasound communications while the near-field communications are disabled.

8. An apparatus comprising:
    a network interface configured to obtain or provide network communications; and
    one or more processors coupled to the network interface, wherein the one or more processors are configured to:
        obtain an indication that a first mobile device is in a predetermined proximity to a non-mobile device;
        in response to obtaining the indication that the first mobile device is in the predetermined proximity to the non-mobile device, permit the first mobile device to pair with the non-mobile device;
        generate whitelisted information associated with the first mobile device by adding information associated with the first mobile device to a whitelist that controls mobile device pairing for the non-mobile device;
        obtain an indication that a given mobile device has obtained one or more keep-alive messages from the non-mobile device;
        based on the whitelisted information associated with the first mobile device, determine whether to permit the given mobile device to pair or remain paired with the non-mobile device; and in response to determining to permit the given mobile device to pair or remain paired with the non-mobile device, permit the given mobile device to pair or remain paired with the non-mobile device.

9. The apparatus of claim 8, wherein the one or more processors are further configured to:

in response to determining not to permit the given mobile device to pair or remain paired with the non-mobile device, prevent the given mobile device from pairing with the non-mobile device.

10. The apparatus of claim 8, wherein the given mobile device is the first mobile device, and wherein the one or more processors are configured to:

permit the first mobile device to remain paired with the non-mobile device.

11. The apparatus of claim 8, wherein the given mobile device is a second mobile device, and wherein the one or more processors are configured to:

generate whitelisted information identifying a user associated with the first mobile device;

determine whether the second mobile device is associated with the user; and permit the second mobile device to pair with the non-mobile device.

12. The apparatus of claim 8, wherein the one or more processors are further configured to:

obtain log-in credentials of a user associated with the first mobile device; and generate the whitelisted information associated with the first mobile device in response to obtaining the log-in credentials.

13. The apparatus of claim 8, wherein the one or more processors are further configured to:

obtain a log-out request; and in response to obtaining the log-out request, remove the information associated with the first mobile device from the whitelist.

14. The apparatus of claim 8, wherein the non-mobile device is configured for near-field communications and ultrasound communications, and wherein the one or more processors are configured to:

obtain an indication that the first mobile device obtained an initial pairing message via the near-field communications while the ultrasound communications are disabled; and obtain the indication that the given mobile device has obtained the one or more keep-alive messages via the ultrasound communications while the near-field communications are disabled.

15. One or more non-transitory computer readable storage media encoded with instructions that, when executed by a processor, cause the processor to:

obtain an indication that a first mobile device is in a predetermined proximity to a non-mobile device;

in response to obtaining the indication that the first mobile device is in the predetermined proximity to the non-mobile device, permit the first mobile device to pair with the non-mobile device;

generate whitelisted information associated with the first mobile device by adding information associated with the first mobile device to a whitelist that controls mobile device pairing for the non-mobile device;

obtain an indication that a given mobile device has obtained one or more keep-alive messages from the non-mobile device;

based on the whitelisted information associated with the first mobile device, determine whether to permit the given mobile device to pair or remain paired with the non-mobile device; and in response to determining to permit the given mobile device to pair or remain paired with the non-mobile device, permit the given mobile device to pair or remain paired with the non-mobile device.

16. The one or more non-transitory computer readable storage media of claim 15, wherein the instructions further cause the processor to:

in response to determining not to permit the given mobile device to pair or remain paired with the non-mobile device, prevent the given mobile device from pairing with the non-mobile device.

17. The one or more non-transitory computer readable storage media of claim 15, wherein the given mobile device is the first mobile device, and wherein the instructions further cause the processor to:

permit the first mobile device to remain paired with the non-mobile device.

18. The one or more non-transitory computer readable storage media of claim 15, wherein the given mobile device is a second mobile device, and wherein the instructions further cause the processor to:

generate whitelisted information identifying a user associated with the first mobile device;

determine whether the second mobile device is associated with the user; and permit the second mobile device to pair with the non-mobile device.

19. The one or more non-transitory computer readable storage media of claim 15, wherein the instructions further cause the processor to:

obtain log-in credentials of a user associated with the first mobile device; and generate the whitelisted information associated with the first mobile device in response to obtaining the log-in credentials.

20. The one or more non-transitory computer readable storage media of claim 15, wherein the instructions further cause the processor to:

obtain a log-out request; and in response to obtaining the log-out request, remove the information associated with the first mobile device from the whitelist.

* * * * *